(12) United States Patent
Rokhsaz

(10) Patent No.: US 11,562,156 B2
(45) Date of Patent: *Jan. 24, 2023

(54) RFID READER TO DETERMINE AN ESTIMATED RESONANT FREQUENCY OF A RFID TAG

(71) Applicant: RFMicron, Inc., Austin, TX (US)

(72) Inventor: Shahriar Rokhsaz, Austin, TX (US)

(73) Assignee: RFMicron, Inc., Austin, TX (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/062,602

(22) Filed: Oct. 4, 2020

(65) Prior Publication Data

US 2021/0019481 A1 Jan. 21, 2021

Related U.S. Application Data

(63) Continuation of application No. 16/133,327, filed on Sep. 17, 2018, now Pat. No. 10,796,111, which is a continuation-in-part of application No. 12/845,654, filed on Jul. 28, 2010, now Pat. No. 10,079,825.

(60) Provisional application No. 61/273,227, filed on Aug. 1, 2009.

(51) Int. Cl.
*G06K 7/10* (2006.01)
*G06K 19/07* (2006.01)
*G06K 7/00* (2006.01)

(52) U.S. Cl.
CPC ....... *G06K 7/10158* (2013.01); *G06K 7/0008* (2013.01); *G06K 19/0723* (2013.01)

(58) Field of Classification Search
CPC ............. G06K 19/0723; G06K 7/0008; G06K 7/10158

USPC .......................... 340/10.1, 449, 588, 870.17
See application file for complete search history.

(56) References Cited

U.S. PATENT DOCUMENTS

| 6,091,935 | A | 7/2000 | Alexander |
| 6,980,084 | B1 * | 12/2005 | Yones ................ G06K 19/0701 340/10.34 |
| 7,643,637 | B2 | 1/2010 | Venkatesan |
| 8,049,594 | B1 | 11/2011 | Baranowski |
| 8,154,405 | B2 | 4/2012 | Gravelle |

(Continued)

OTHER PUBLICATIONS

"Nonlinear Dynamics of Chaotic Double-Loop Sigma Delta Modulation," Orla Freely, In 1994 IEEE International Symposium on Circuits and Systems, pp. 101-1014.

(Continued)

*Primary Examiner* — Yong Hang Jiang
(74) *Attorney, Agent, or Firm* — Garlick & Markison; Timothy W. Markison

(57) ABSTRACT

A method begins by a radio frequency identification (RFID) reader transmitting a first and second radio frequency (RF) signal of a plurality of RF signals, which each include a unique carrier frequency and an instruction to an RFID tag to respond with a received power level indication. The method continues by the RFID reader receiving, in response to the first and second signals sent at a first and second carrier frequency, a first and second response from the RFID tag that includes a first and second received power level indication. The method continues by the RFID reader determining an estimated resonant frequency of the RFID tag based on the first and second received power level indications and the first and second carrier frequencies.

12 Claims, 10 Drawing Sheets

(56) References Cited

U.S. PATENT DOCUMENTS

| | | | |
|---|---|---|---|
| 8,335,930 B2 | 12/2012 | Johnson | |
| 10,140,567 B2 * | 11/2018 | Wilkinson | G06K 19/0723 |
| 2006/0071778 A1 | 4/2006 | Vesikivi | |
| 2006/0124740 A1 | 6/2006 | Woodard | |
| 2006/0180371 A1 | 8/2006 | Breed | |
| 2006/0214773 A1 * | 9/2006 | Wagner | G06K 19/0701 340/10.2 |
| 2006/0293085 A1 | 12/2006 | Lauper | |
| 2007/0013483 A1 * | 1/2007 | Stewart | G06K 7/0008 343/745 |
| 2007/0194926 A1 * | 8/2007 | Bayley | G06K 19/07345 340/572.1 |
| 2007/0279286 A1 * | 12/2007 | Coutts | H01Q 9/0442 343/700 MS |
| 2008/0179390 A1 | 7/2008 | Harjani | |
| 2011/0025473 A1 | 2/2011 | Rokhsaz | |
| 2011/0234371 A1 | 9/2011 | Linton | |
| 2012/0300933 A1 | 11/2012 | Baranowski | |
| 2012/0306616 A1 | 12/2012 | Griffin | |
| 2012/0313757 A1 | 12/2012 | Volpi | |
| 2012/0319823 A1 | 12/2012 | Bulter | |
| 2014/0210598 A1 * | 7/2014 | Mitchell | G06K 7/10158 340/10.5 |
| 2016/0050469 A1 * | 2/2016 | Subiry | H04Q 9/00 340/870.17 |
| 2017/0110796 A1 * | 4/2017 | Rokhsaz | H04B 5/0062 |
| 2018/0018481 A1 * | 1/2018 | Paulson | G06K 7/10336 |

OTHER PUBLICATIONS

RFID Handbook: Applications, Technology, Security, and Privacy. Ahson et al. CRC Press, Boca Raton, FL, USA, 2008, p. 490.
The Promising but Plodding RFID Industry, Stanford Group Company, Apr. 1, 2008.

* cited by examiner

PRIOR ART

RFID READER TO DETERMINE AN ESTIMATED RESONANT FREQUENCY OF A RFID TAG

CROSS REFERENCE TO RELATED PATENTS

The present U.S. Utility Patent Applications claims priority pursuant to 35 U.S.C. § 120 as a continuation of U.S. Utility patent application Ser. No. 16/133,327, entitled "DETERMINING AN ENVIRONMENTAL CONDITION OF AN RFID TAG", filed Sep. 17, 2018, issuing as U.S. Pat. No. 10,796,111 on Oct. 6, 2020, which is a continuation-in-part of U.S. Utility patent application Ser. No. 12/845,654, entitled "METHOD AND APPARATUS FOR AUTHENTICATING RFID TAGS", filed Jul. 28, 2010, issued as U.S. Pat. No. 10,079,825 on Sep. 18, 2018, which claims priority pursuant to 35 U.S.C. § 119(e) to U.S. Provisional Application No. 61/273,227, entitled "METHOD AND APPARATUS FOR A SECURE RFID TAG", filed Aug. 1, 2009, all of which are hereby incorporated herein by reference in their entirety and made part of the present U.S. Utility Patent Applications for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

The invention relates generally to radio-frequency identification ("RFID") systems and, in particular, to a method and apparatus for determining an environmental condition of an RFID tag.

Description of the Related Art

As is known, a radio frequency identification ("RFID") system may include multiple tags and at least one reader. Shown in FIG. 1 is prior art RFID system 10 which includes a single, exemplary tag 12 and a reader 14. Tag 12 includes an integrated circuit (not shown) for storing and processing information, and an antenna circuit (not shown) for exchanging data with reader 14. The integrated circuit of tag 12 implements a unique identifier ("ID") 18 and control logic (not shown) adapted to facilitate the operation of tag 12 in RFID system 10. Depending on the manufacturing technology selected to implement tag 12, ID 18 may be implemented using any of the known types of persistent memory, such as read-only memory ("ROM"), programmable ROM ("PROM"), ultra-violet erasable PROM ("UV-PROM"), electrically-erasable PROM ("EE-PROM"), fast EE-PROM ("FLASH"), or the like. As may be desired, ID 18 may be as simple as a unique binary bit string or as complex as an Electronic Product Code ("EPC") as specified, e.g., by the EPC global Tag Data Standards (currently at Version 1.4) and as used in many passive UHF RFID applications. As is known, the nature of ID 18 will be system specific and will, in general, be determined by a host system adapted to manage the RFID system 10.

In the illustrated form, the integrated circuit of tag 12 further includes a store 16 adapted to store a system-specific data object, hereinafter referred to as data object 20. Depending on the application, store 16 may be implemented using any of the known types of persistent memory, which may or may not be the same type as selected to implement the ID 18. Data object 20 may include such information as the name of the manufacturer, product details, pricing information, and the like. As is known, the nature of data object 20 will be system specific and will, in general, be determined by the host system.

During normal operation, reader 14 interrogates tag 12 [illustrated in FIG. 1 as transaction 1], and receives ID 18 and data object 20 from tag 12 [transaction 2]. Depending on the application, tag interrogation may comprise one or more transaction cycles. For example, in one application, tag 12 can be adapted to provide both ID 18 and data object 20 to reader 14 during a single transaction cycle. Alternatively, tag 12 can be adapted to provide ID 18 during a first transaction cycle, and to provide data object 20, if at all, during a second transaction cycle.

As is known, any of various security procedures may be employed within reader 14 to validate the ID 18 received from tag 12, and within tag 12 to verify that the reader 14 is entitled to receive the data object 20. If necessary, store 16 can be adapted to store any required control or security information. In addition, the integrated circuit of tag 12 may include special-purpose security logic, such as hash table logic and random number generation logic, to control access to data object 20.

As explained in "The Promising but Plodding RFID Industry", Stanford Group Company, 1 Apr. 2008, ("Stanford Paper"), a copy of which is submitted herewith and incorporated herein in its entirety by reference:

"Radio Frequency Identification (RFID) technology promises to be a transformational technology, replacing barcodes and other supply chain management technologies with cheap chip-based tags that can be instantaneously and accurately read from significant distances." [p. 1]

"Radio Frequency Identification ('RFID') technology refers to a wide range of microchip-based systems that can transmit and sometimes receive information via wireless interfaces." [p. 5]

"Ranging from sophisticated government ID cards to simple asset tracking tags, RFID chips are available in a large variety of formats and security configurations, with each 'flavor' of RFID chip tailored specifically for certain applications." [p. 5]

The Stanford Paper discusses a tag as being "applied to or incorporated into a product, animal, or person for the purpose of identification and tracking using radio waves". Far field tags, defined as operating at a distance less than 12 meters from the reader, and near field tags, defined as operating at a distance less than 0.5 meters from the reader may be used. Tags are initially powered down and will wake up upon receipt of a sufficiently strong RF signal. A brief summary of this prior art process is presented on page 7 of the Stanford Paper. The Stanford Paper then went on to note:

"Moreover, at last month's DoD RFID Summit, the Army described its plans to shift away from the data-rich tags that it currently buys . . . and instead migrate to 'license plate tags' that simply contain a unique number which ties to information about a container in a DoD database.

The basic concept is to get away from having information across a distributed network and instead simply use the tags as a pointer to information in a centralized network. The end goal: cheaper tags available from multiple vendors . . . " [p. 16]

As shown in FIG. 2, a prior art RFID system 10A might include a tag 12A, a reader 14A, and a store 16A. During operation, reader 14A interrogates tag 12A [illustrated in FIG. 2 as transaction 1], and receives ID 18A from tag 12A [transaction 2]. Reader 14A then provides ID 18A to store 16A [transaction 3], and receives data object 20A from store 16A [transaction 4]. As is known, any of various security procedures may be employed within reader 14A to validate the ID 18A stored on tag 12A, and within store 16A to verify that the reader 14A is entitled to receive data object 20A. In this embodiment, tag 12A is dumb, i.e., it stores no data, per se, but simply includes the unique tag ID 18A comprising information sufficient to access data object 20A now stored in store 16A. In a typical commercial application, data object 20A will typically include vendor identification information, product details, pricing and availability, etc. In a distributed network implementation, vendor-provided data object 20A may be stored locally within the reader 14A, i.e., store 16A would be integrated into reader 14A. Alternatively, in a centralized network implementation, vendor-provided data object 20A may be stored at a remote store 16A, typically provided by the vendor or an independent service provider ("ISP"). In both configurations, a public communication network, such as plain old telephone service ("POTS") or the Internet, provides a suitable medium for data distribution. In both types of systems, however, sufficient information is provided by tag 12A to directly access the respective data object 20A.

As is known, objects may be accessed via a Uniform Resource Identifier ("URI"). A URI may comprise a Uniform Resource Locator ("URL"), a Uniform Resource Name ("URN"), or a Uniform Resource Characteristic ("URC"). Each plays a specific role within the URI scheme, namely: (i) URLs are used for locating or finding resources; (ii) URNs are used for identification; and (iii) URCs are used for including meta-information. Although the term typically refers to communication on the World Wide Web ("WWW"), it can also comprise communication over a general network. For example, a URI comprising an International Standard Book Number ("ISBN") number may be used to retrieve a book stored in electronic form in store 16A, or a URL comprising a web link may be used to retrieve a web page stored in electronic form (or dynamically generated) in store 16A.

As is known, prior art RFID systems have several disadvantages. One such disadvantage is that smart tags tend to be relatively expensive and complex, and yet, in general, still have insufficient on-tag storage capacity to accommodate the continuously-increasing data payload. Distributed RFID databases are typically complex, difficult to understand, and time-consuming to maintain. Further, sensitive data is difficult to distribute reliably and difficult to maintain securely at all locations where the data may be stored.

Yet another disadvantage is in the area of security. In general, security issues fall into two basic categories for RFID systems: (i) privacy; and (ii) authentication. Privacy issues include the case of unauthorized readers harvesting information from valid tags. In general, RFID tags silently respond to interrogation by a reader, i.e., without express notification to any party. Often, the unique ID for the tag will comprise manufacturer, product, and serial number information. Thus, without proper security, clandestine scanning of information is a plausible threat. This threat becomes particularly sensitive when personal or proprietary information is included with the RFID tag id, or when the RFID tag id can be readily associated with that information.

Authentication issues can arise when a reader harvests information from counterfeit tags. In general, RFID tags are vulnerable to copy and counterfeit techniques because scanning and replicating tags and tag ids requires relatively little money or expertise. For example, an EPC is a well-defined bit string, easily copied like any other, and simple to emulate via a personal computer ("PC") equipped to transmit the counterfeit codes.

In an attempt to eliminate these and other security threats, much has been done to utilize existing security methods such as passwords defined by the International Organization for Standardization ("ISO"), public key encryption, and other forms of cryptographic security. However, many such techniques add complexity and cost to the RFID tags. Optimally, to enable secure large-scale, item-level tagging, one would want to see the cost of the RFID tag driven down below what it is currently today.

These and related issues are discussed in the Parent Provisional. As a result of these and related problems, RFID technology adoption has been far slower than originally anticipated and desired. We submit that what is needed is a more efficient, reliable, and secure system for linking a tag to a corresponding object.

Figure 1:
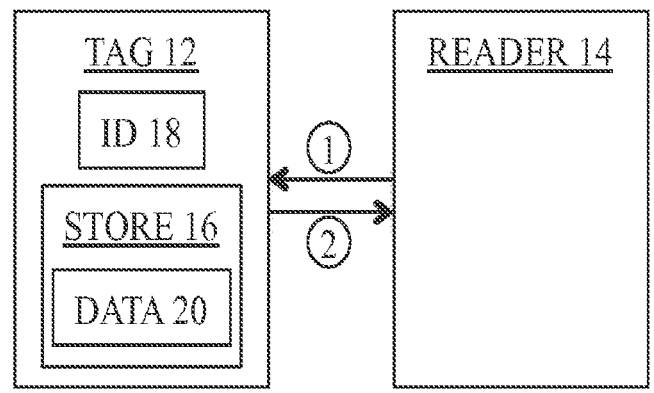
FIG. 1 illustrates in block diagram form, a prior art RFID system, including a tag and a reader.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

Figure 3:
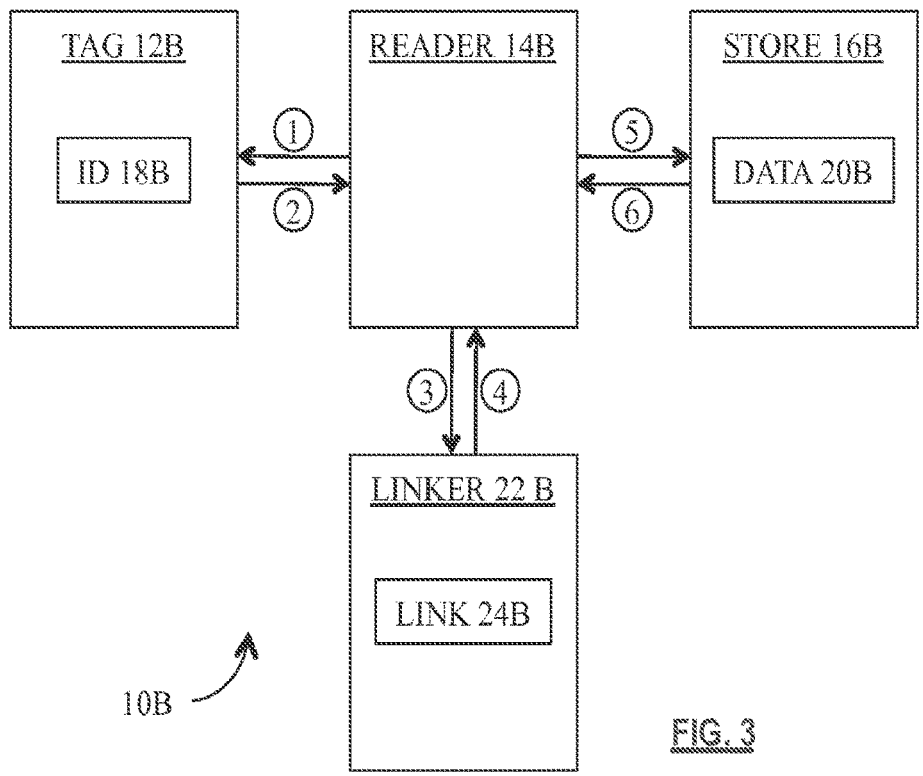
FIG. 3 illustrates in block diagram form, an RFID system constructed in accordance with a preferred embodiment of our invention.

In accordance with the preferred embodiment of our invention as shown in FIG. 3, our RFID system 10B includes tag 12B, reader 14B, store 16B, and a linker 22B. In general, reader 14B is adapted to interrogate tag 12B [illustrated in FIG. 3 as transaction 1], and to receive ID 18B provided by tag 12B [transaction 2] in response to that interrogation. Reader 14B is further adapted to selectively provide ID 18B to linker 22B [transaction 3], and to receive a link 24B from linker 22B [transaction 4]. Finally, reader 14B is adapted to selectively provide the link 24B to store 16B [transaction 5], and to receive a data object 20B from store 16B [transaction 6].

Figure 4:
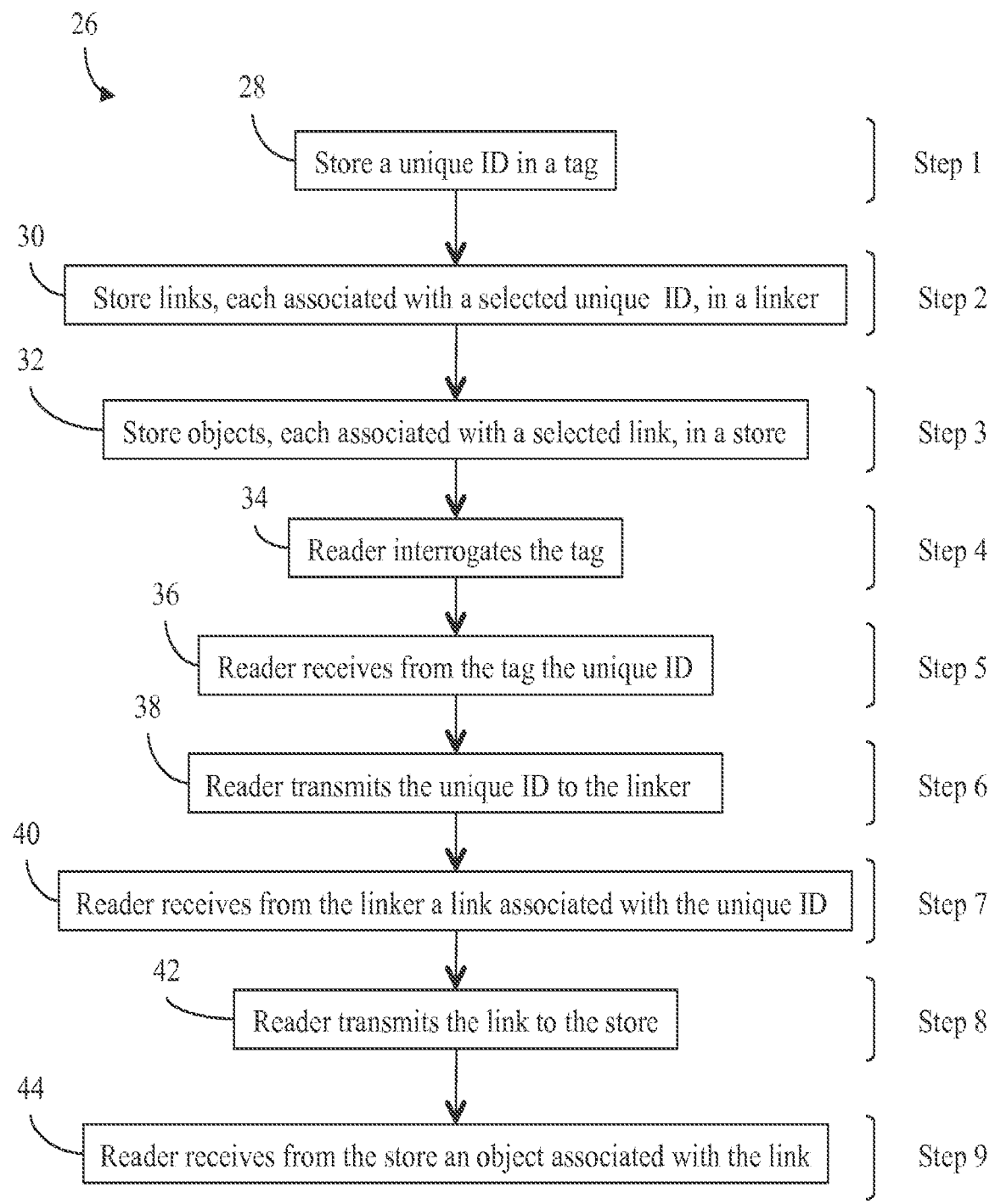
FIG. 4 illustrates in flow diagram form, the sequencing of operations of the RFID system of FIG. 3.

As shown in FIG. 4, our preferred method 26 for linking tag 12B to a data object 20B comprises the following steps:

Step 1: we store a unique ID 18B in tag 12B (step 28).

Step 2: we store links 24B, each associated with a selected unique ID 18B, in linker 22B (step 30).

Step 3: we store data objects 20B, each associated with a selected link 24B, in store 16B (step 32).

Step 4: our reader 14B interrogates tag 12B (step 34).

Step 5: our reader 14B receives from tag 12B the ID 18B (step 36).

Step 6: our reader 14B transmits ID 18B to the linker 22B (step 38).

Step 7: our reader 14B receives from linker 22B the link 24B associated with ID 18B (step 40).

Step 8: our reader 14B transmits link 24B to the store 16B (step 42).

Step 9: our reader 14B receives from the store 16B the data object 20B associated with link 24B (step 44).

In accordance with our invention, linker 22B is adapted to store for each unique ID 18B a corresponding link 24B. During normal operation, linker 22B receives each ID 18B provided by reader 14B, and, if the received ID 18B corresponds to link 24B, linker 22B provides link 24B to reader 14B. Storage of links 24B in linker 22B may be implemented using any of several existing technologies, such as relational databases, associative array structures, lookup tables or the like. As may be desired, linker 22B, including links 24B, may be implemented as either a hardware or software component within reader 14B. Alternatively, linker 22B may be implemented as a stand-alone component either co-located with reader 14B or at a different location remote from reader 14B. For example, in our preferred embodiment, we implement linker 22B as a link server running on a stand-alone computer system and adapted to perform transactions 3 and 4 via the Internet. This configuration is well adapted to our preferred method of system operation in that maintenance of links 24B is relatively centralized with respect to reader 14B (enabling us to easily support multiple readers 14B), thus facilitating rapid posting of changes in links 24B as well as providing, if desired, a secure communication tunnel with both reader 14B and the ultimate source of links 24B (not shown).

Also in accordance with our invention, store 16B is adapted to store for each unique link 24B a corresponding data object 20B. During normal operation, store 16B receives each link 24B provided by reader 14B, and, if the received link 24B corresponds to a data object 20B, store 16B provides data object 20B to reader 14B. Storage of data object 20Bs in store 16B may be implemented using any of several existing technologies, such as relational databases, associative array structures, lookup tables or the like. As may be desired, store 16B, including data objects 20B, may be implemented as either a hardware or software component within reader 14B. Alternatively, store 16B may be implemented as a stand-alone component either co-located with reader 14B or at a different location remote from reader 14B. For example, in our preferred embodiment, we recommend implementing store 16B as a web server running on a stand-alone computer system and adapted to perform transactions 5 and 6 via the Internet. This configuration is well adapted to our preferred method of system operation in that maintenance of data object 20Bs is relatively centralized with respect to reader 14B (enabling us to easily support multiple readers 14B), thus facilitating rapid posting of changes in data object 20Bs as well as providing, if desired, a secure communication tunnel with both reader 14B and the ultimate source of data objects 20B (not shown).

In accordance with our invention, we are able to provide the controllability and data coherence benefits of prior art centralized systems while simultaneously providing the flexibility and timeliness of prior art distributed systems. In contrast to prior art distributed data systems, in our preferred embodiment, only links 24B need to be distributed, where they may be maintained in linker 22B in a relatively simple, easily understood and maintained database structure. In contrast to prior art centralized data systems, in our preferred embodiment, relocation or reorganization of data objects 20B does not require modification of the corresponding ID 18B stored in tags 12B, but, rather, only the impacted links 24B. Also, our distributed-link, centralized-data organization is especially well suited to take advantage of the inherent benefits of the now-ubiquitous Internet.

Hidden Code Security

Figure 5:
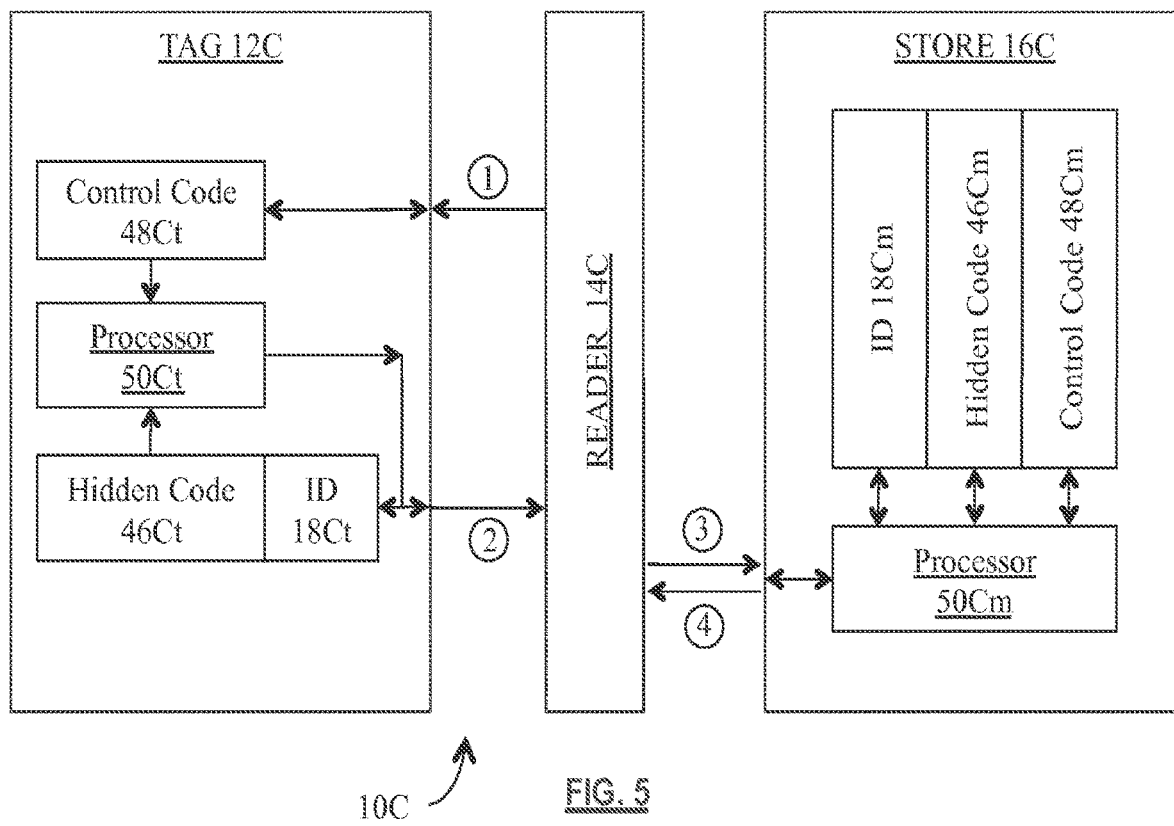
FIG. 5 illustrates in block diagram form, an RFID authentication system constructed in accordance with a preferred embodiment of our invention.

In accordance with our invention, the security issues described above are addressed by our system 10C illustrated in FIG. 5. In general, our system 10C is comprised of RFID tag 12C, reader 14C and store 16C. In the illustrated embodiment, tag 12C is adapted to store a unique tag ID 18Ct, a tag hidden code 46Ct and tag control codes 48Ct. In addition, tag 12C includes a tag processor 50Ct adapted to selectively develop a tag authentication code from the tag hidden code 46Ct as determined by the tag control codes 48Ct. Also, as illustrated, store 16C is adapted to store a unique master ID 18Cm, a master hidden code 46Cm and master control codes 48Cm. In addition, store 16C includes a master processor 50Cm adapted to selectively develop a master authentication code from the master hidden code 46Cm as determined by the master control codes 48Cm.

In one embodiment, reader 14C is adapted to selectively interrogate tag 12C using, e.g., a singulation command [illustrated in FIG. 5 as transaction 1]. In response, tag 12C provides to reader 14C a tag identification sequence comprising the concatenation of the tag ID 18Ct and the tag authentication code [transaction 2], which reader 14C then forwards to store 16C [transaction 3]. Preferably, while the reader 14C is interrogating the tag 12C, store 16C is developing a master identification sequence comprising the master ID 18Cm and the master authentication code. Upon receipt, store 16C compares the tag identification sequence with the master identification sequence and then provides to reader 14C a validation signal that indicates either that tag 12C has been authenticated or not [transaction 4]. Optionally, in the event that the tag 12C cannot be authenticated, reader 14C and store 16C may selectively vary tag control codes 48Ct in an attempt to determine the cause of the failure of authentication or to implement an alternate or supplemental authentication process.

In one other embodiment, tag 12C may be adapted to provide only the tag ID 18Ct in response to the singulation sequence. In response to receiving ID 18Ct, reader 14C may thereafter selectively request tag 12C to develop and provide the tag authentication code. Upon receipt, reader 14C may then forward to the store 16C both the ID 18Ct and the tag authentication code for authentication as discussed above. Optionally, the store 16C may be adapted to provide the master authentication code in response to receiving the ID 18Ct, so that the reader 14C may itself perform the authentication.

Figure 6:
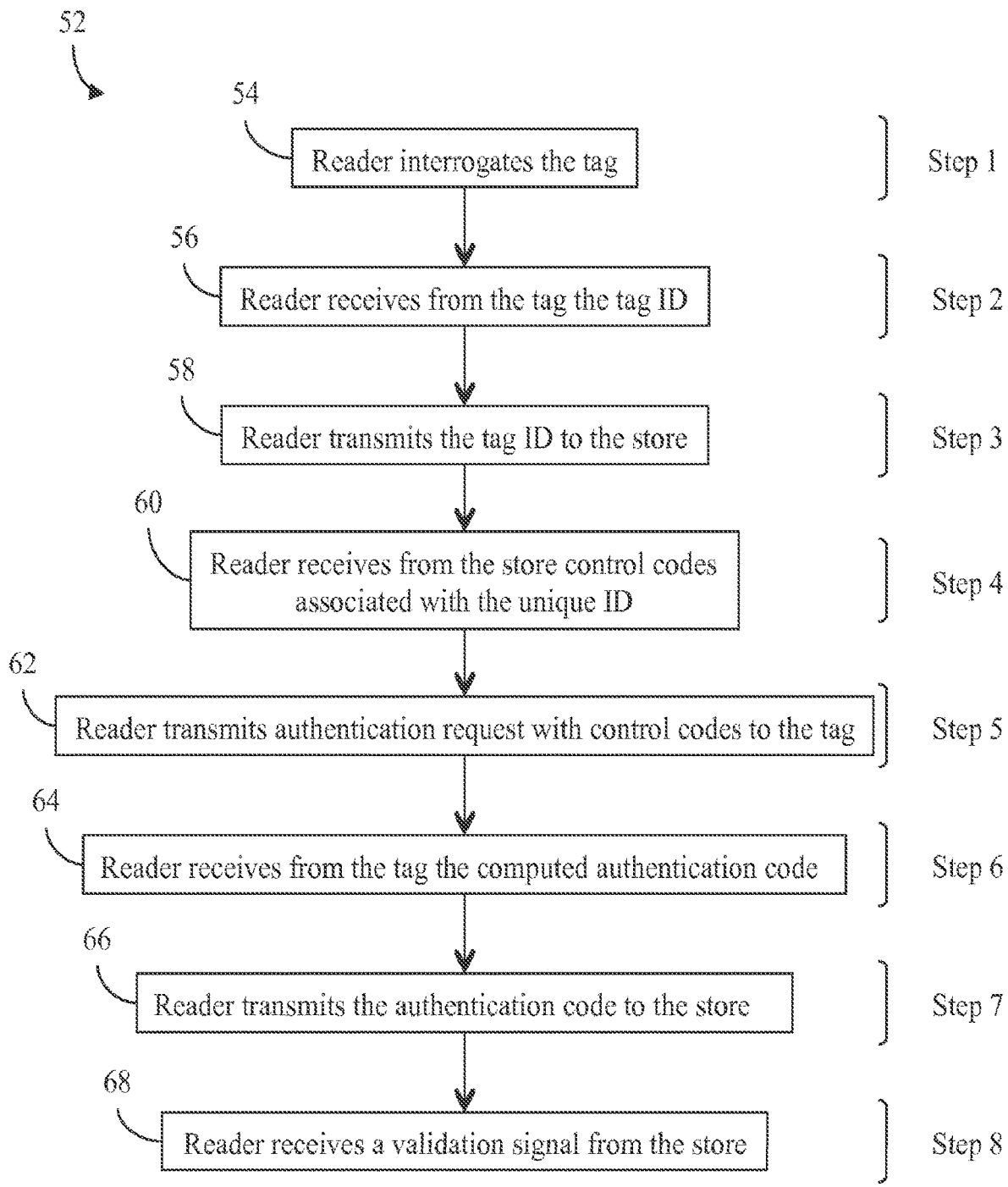
FIG. 6 illustrates in flow diagram form, a process utilized by our RFID authentication system shown in FIG. 5.

As shown in FIG. 6, one other method 52 for implementing hidden code security comprises the steps of:

Step 1: our reader 14C interrogates the tag 12C (step 54).

Step 2: our reader 14C receives from tag 12C the tag ID 18Ct (step 56).

Step 3: our reader 14C transmits the tag ID 18Ct to the store 16C (step 58).

Step 4: our reader 14C receives from store 16C control codes 48Cm associated with tag ID 18Cm (step 60).

Step 5: our reader 14C transmits control codes 48Cm to the tag 12C as part of the authentication request (step 62).

Step 6: our reader 14C receives from the tag 12C the computed authentication code (step 64).

Step 7: our reader 14C transmits the authentication code to the store 16C (step 66).

Step 8: our reader 14C receives from the store 16C a validation signal (step 68).

Figure 7:
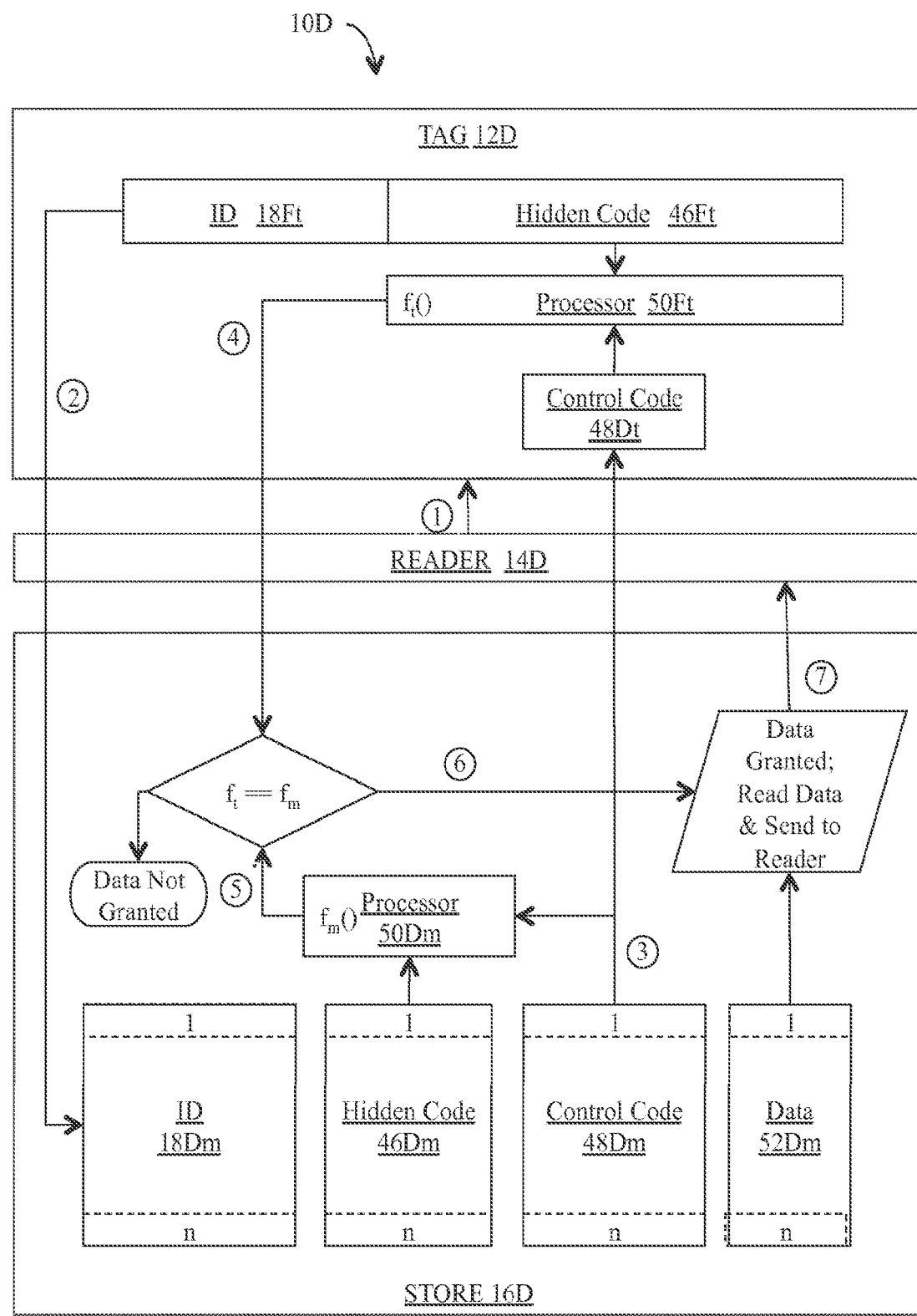
FIG. 7 illustrates in block diagram form, an alternate embodiment of the RFID system shown in FIG. 5.

In one other embodiment, illustrated in FIG. 7, the system operates similarly to the embodiment illustrated in FIG. 5. Again, the reader 14D is adapted to selectively interrogate tag 12D using a singulation command [transaction 1]. In response, tag 12D provides to reader 14D the tag ID 18Dt, which reader 14D then transmits to store 16D [transaction 2]. Using the received tag ID 18Dt, store 16D retrieves an associated control code 48Dm for transmission back to tag 12D via reader 14D [transaction 3]. Upon receipt of the control code, tag 12D uses processor 50Dt to develop a tag authentication code as a function of the received control code 48Dt and the tag hidden code 46Dt, for transmission back to store 16D via reader 14D [transaction 4]. Substantially independently, store 16D uses processor 50Dm to develop a master authentication code as a function of the master control code 48Dm and a master hidden code 46Dm associated with the received tag ID 18Dt [transaction 5]. If the received tag authentication code compares favorably to the internally developed master authentication code [transaction 6], store 16D retrieves a data 52D associated with the received tag ID 18Dt for transmission to the reader 14D for further processing [transaction 7]. Optionally, in the event that tag 12D cannot be authenticated, reader 14D and store 16D may selectively vary tag control codes 48Dt in an attempt to determine the cause of the validation failure.

Figure 8:
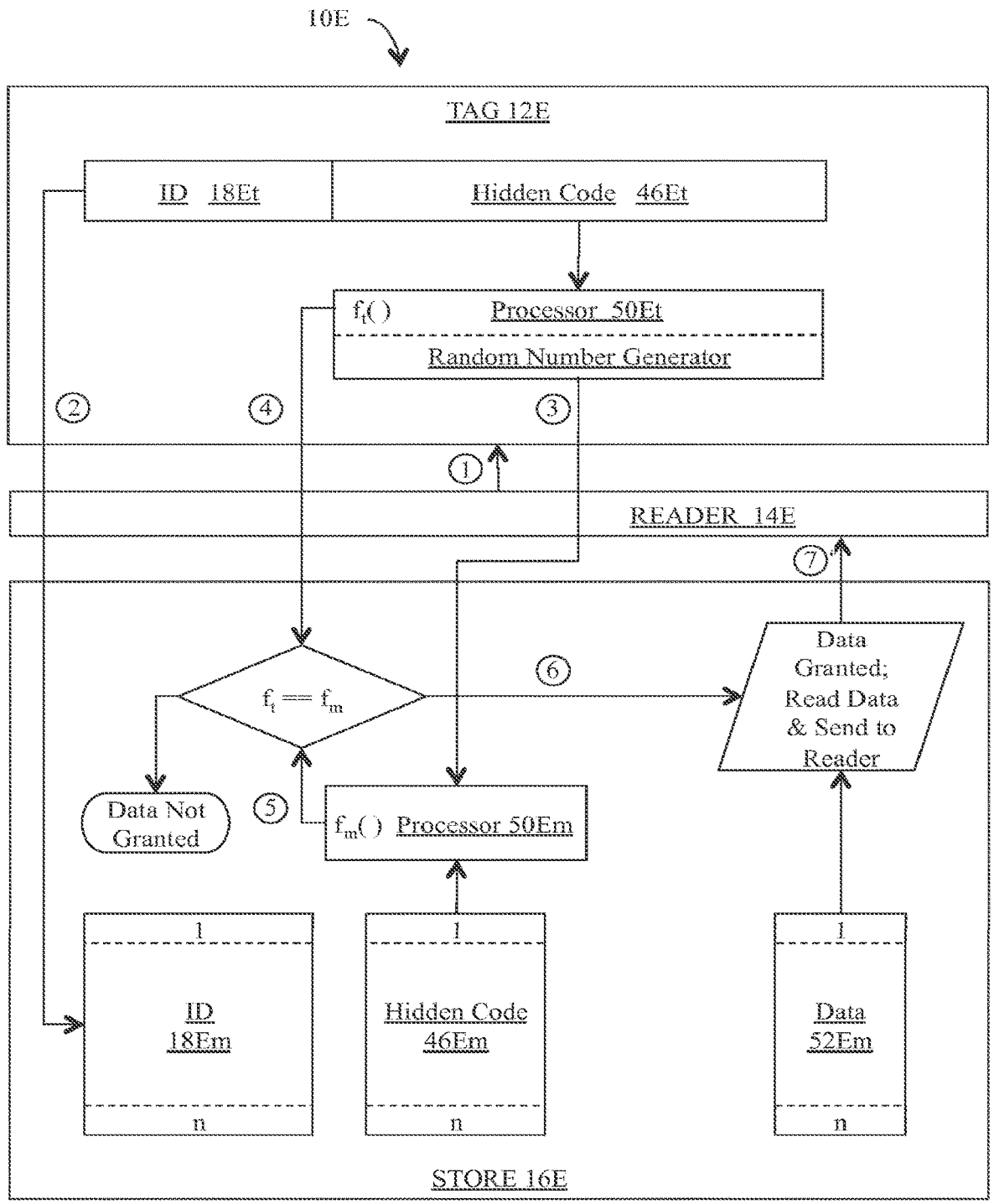
FIG. 8 illustrates in block diagram form, another alternate embodiment of the RFID system shown in FIG. 5.

In one other embodiment, illustrated in FIG. 8, the system operates similarly to the embodiment illustrated in FIG. 7. Again, the reader 14E is adapted to selectively interrogate tag 12E using a singulation command [transaction 1]. In response, tag 12E provides the tag ID 18Et to store 16E via reader 14E [transaction 2]. Within tag 12E, tag processor 50Et first generates a random number and then develops a tag authentication code as a function, $f_t(\ )$ of that random number and the tag hidden code 46Et. Preferably, as each is developed, tag 12E transmits both the random number and the tag authentication code to store 16E via reader 14E [transactions 3 and 4, respectively]. Within store 16E, store processor 50Em develops a master authentication code as a function, $f_m(\ )$ of the received random number and a master hidden code 46Em associated with the received tag ID 18Et [transaction 5]. If the received tag authentication code compares favorably to the internally developed master authentication code [transaction 6], store 16E transmits a data 52Em associated with the received tag ID 18Et to the reader 14E for further processing [transaction 7]. Optionally, in the event that tag 12E cannot be authenticated, reader 14E and store 16E may selectively repeat this sequence in an attempt to determine the cause of the validation failure, each time using a new random number generated by tag processor 50Et. If desired, tag processor 50Et may be adapted to implement the function, $f_t(\ )$ in a bit-serial manner, thus enabling, in some embodiments, both the random number and tag authentication code to be transmitted substantially simultaneously to store 16E using a suitable bit-serial transmission protocol.

Figure 9:
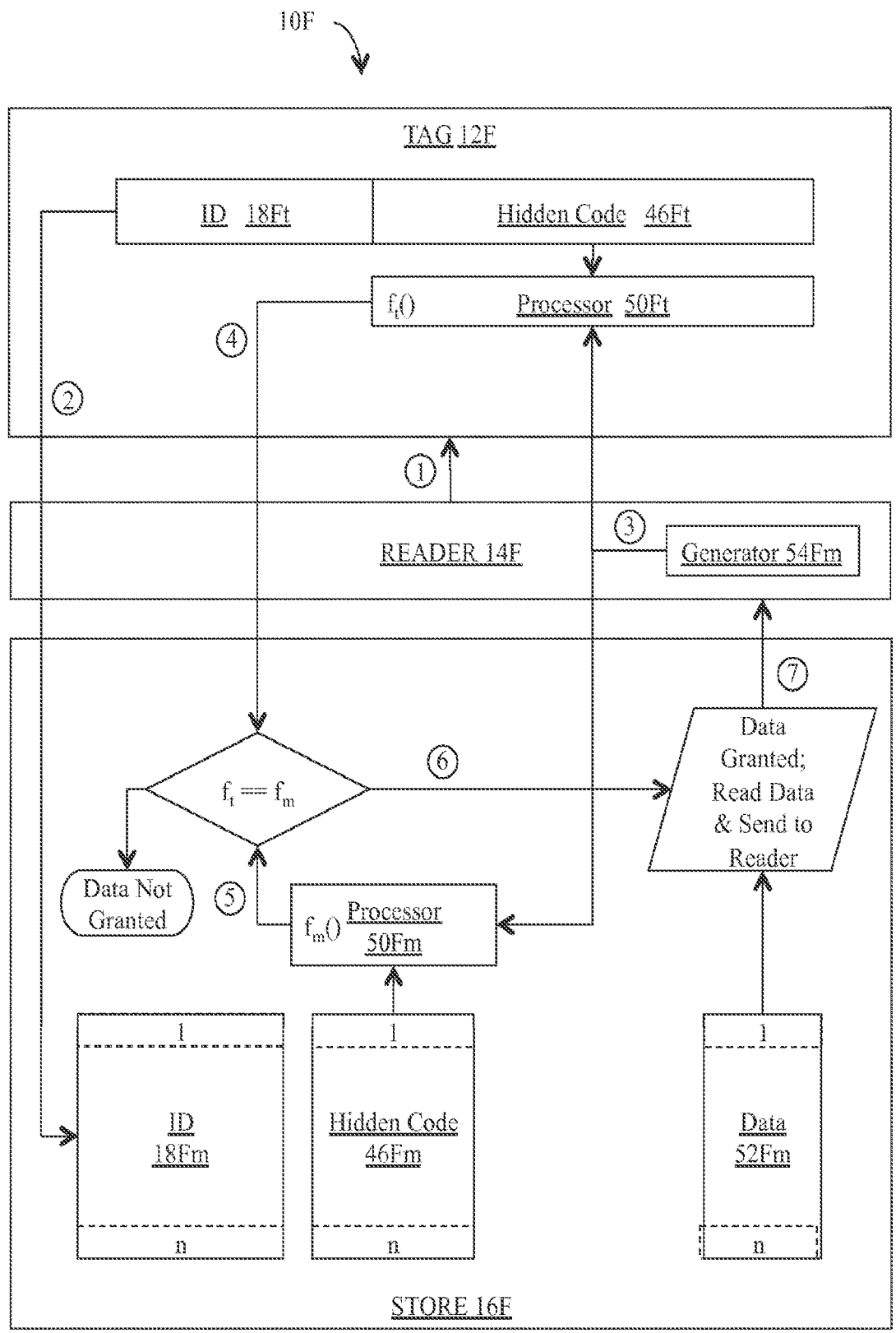
FIG. 9 illustrates in block diagram form, yet another alternate embodiment of the RFID system shown in FIG. 5.

In yet another embodiment, illustrated in FIG. 9, the system operates similarly to the embodiments illustrated in FIGS. 7 and 8. However, in this embodiment, rather than storing a plurality of master control codes, reader 14F includes a generator 54Fm adapted to selectively generate a substantially random number. As in FIGS. 7 and 8, the reader 14F is adapted to selectively interrogate tag 12F using a singulation command [transaction 1]. In response, tag 12F provides the tag ID 18Ft to store 16F via reader 14F [transaction 2]. In one embodiment, in response to receiving the tag ID 18Ft, reader 14F transmits the random number to both the processor 50Ft and the store 16F [transaction 3]; alternatively, reader 14F may transmit the random number substantially coincident with the singulation command. In response to receiving the random number, tag processor 50Ft develops the tag authentication code as a function, $f_t(\ )$ of the tag hidden code 46Ft and the received random number, for transmission to the store 16F via reader 14F [transaction 4]. In response to receiving both the tag ID 18Ft and the generated random number, store processor 50Fm develops a master authentication code as a function, $f_m(\ )$ of the random number and a master hidden code 46Fm associated with the received tag ID 18Ft [transaction 5]. If the received tag authentication code compares favorably to the developed master authentication code [transaction 6], store 16F transmits a data 52Fm associated with the received tag ID 18Ft to the reader 14F for further processing [transaction 7]. Optionally, in the event that tag 12F cannot be authenticated, reader 14F and store 16F may selectively repeat this sequence in an attempt to determine the cause of the validation failure, each time using a new random number generated by generator 54Fm. If desired, tag processor 50Ft may be adapted to implement the function, $f_t(\ )$ in a bit-serial manner, thus enabling, in some embodiments, both the incoming random number and the outgoing tag authentication code to be transmitted using a suitable bit-serial transmission protocol.

In accordance with our invention, tag ID 18xt may be a unique proprietary ID that does not contain any company or product specific information. (Note: for convenience of reference hereinafter, we will use the generic place-holder, "x", to indicate any of the several embodiments A-E disclosed above and variants thereof) Tag ID 18xt, as well as the tag hidden code 46xt may be initially registered at production, and may be programmed into a non-volatile form of memory, or allowed to randomly initialize based upon some processing variation and biases; either way, the value are unique at registration. This lack of specific intelligence on the tag is of particular importance when addressing privacy issues. Using a tag ID 18xt that lacks any specific information addresses the aforementioned privacy issue by securely storing vendor information, product serial codes, stock keeping unit ("SKU") information or the like elsewhere, preferably in the store 16x where it can be quickly accessed using the unique tag ID 18xt as an index. In an alternate embodiment, tag ID 18xt may be a unique 96-bit EPC tag ID. Although the tag control code 48x has been described above as being purely static, our invention will accommodate other forms, including, for example, a tag control code comprising a first, fixed portion and a second, substantially random portion. The tag hidden code 46xt is stored so as to be inaccessible through normal commands, e.g., via a standard singulation command. Rather, the tag hidden code 46xt can only be read from the tag 12x after modification, encryption or scrambling by tag processor 50xt in accordance with the control codes 48xt.

In one embodiment, our tag processor 50xt includes, in addition to appropriate timing and control logic, a linear feedback shift register ("LFSR") with programmable feedback logic. In general, a LFSR coefficients portion of control codes 48xt controls the programmable feedback logic so as to define the polynomial implemented by the LFSR. Preferably, a LFSR seed portion of control codes 48xt contain a multi-bit seed by which the LFSR is initialized. In an alternate implementation, tag hidden code 46xt may itself act as the initial seed for the LFSR, while the LFSR coefficients portion of the tag control code 48xt defines only the polynomial implemented by the LFSR. In yet another embodiment, a seed select portion of control codes 48xt may select one of a plurality of sources of the LFSR seed. Typically, the several bits of the LFSR will first be initialized using the selected seed, and the feedback logic configured using the LFSR coefficients portion of control codes 48xt. In response to an authentication request, the tag processor 50xt will compute the authentication code by scrambling the hidden code 46xt using the cyclical output pattern generated by the LFSR. This authentication code is forwarded, together with tag ID 18xt, to the reader 14x which then transmits the same to the store 16x. In one embodiment, the LFSR coefficients portion of control code 48xt define a polynomial function in the following general form:

$$f(h)=a+bh^c+dh^e+fh^g \qquad [\text{Eq. 1}]$$

where: h=seed bits
a, b, c, d, e, f, g=coefficients

As will be understood, the resulting transfer function will be of the general form:

$$f(x)=x*f(h) \qquad [\text{Eq. 2}]$$

Using the embodiment illustrated in FIG. 5 by way of example, store 16C is adapted to store a master ID 18Cm corresponding to tag ID 18Ct, a master hidden code 46Cm corresponding to tag hidden code 46Ct and a master control code 48Cm corresponding tag control code 48Ct. During authentication, store 16C uses master processor 50Cm to compute a master version of the authentication code for validating the authentication code received from the tag 12C. In normal operation, the tag hidden code 46Ct is inaccessible via any other means after scrambling by the tag processor 50Ct. Preferably, a special transfer command sequence is implemented in tag 12C and reader 14C whereby the tag processor 50Ct is placed in a transfer mode of the form:

$$f(x)=x \qquad [\text{Eq. 3}]$$

thus passing the hidden code 50Ct without scrambling or other modification. In one embodiment, this sequence may consist of the reader 14C selectively storing into tag 12C a new tag control code 48Ct specially adapted to implement the desired transfer function. As will be clear, the specific control code 48Ct is dependent on the design of tag processor 50Ct and its internal configuration.

In accordance with our invention, the cyclical nature of the LFSR output assures that the authentication code broadcast by tag 12C will be different for each successive authentication cycle. Indeed, careful design of the tag processor 50Ct and judicious selection of the control code 48Cx can provide operational variation very nearly resembling random generation. As a further deterrent, our method facilitates frequent changes to the control code 48Cx. Without knowledge of the hidden code 46Cx and the current control code 48Cx, and without knowing the specific configuration of the tag processor 50Ct, creating a clone of tag 12C that will reliably pass authentication becomes quite difficult.

As will also be evident to those skilled in the art, other embodiments of the function f(x) are possible. Of particular interest are functions which are computationally intensive to invert or which are intrinsically non-invertible, such as hash tables (see, e.g., Ahson, et. al, *RFID Handbook: Applications, Technology, Security, and Privacy*, CRC Press, Boca Raton, Fla., USA, 2008, p. 490) or chaotic delta-sigma modulators (see, e.g., Freely, "Nonlinear Dynamics of Chaotic Double-Loop Sigma Delta Modulation", IEEE International Symposium on Circuits and Systems, 1994, pp. 101-104) (which utilize nested, non-linear feedback). Using chaotic delta-sigma modulators, some portion of the hidden code bits and the control code bits can be used as the initial state variables while the remaining bits are used as the input sequence to the modulator for a prescribed number of modulator cycles.

Figure 2:
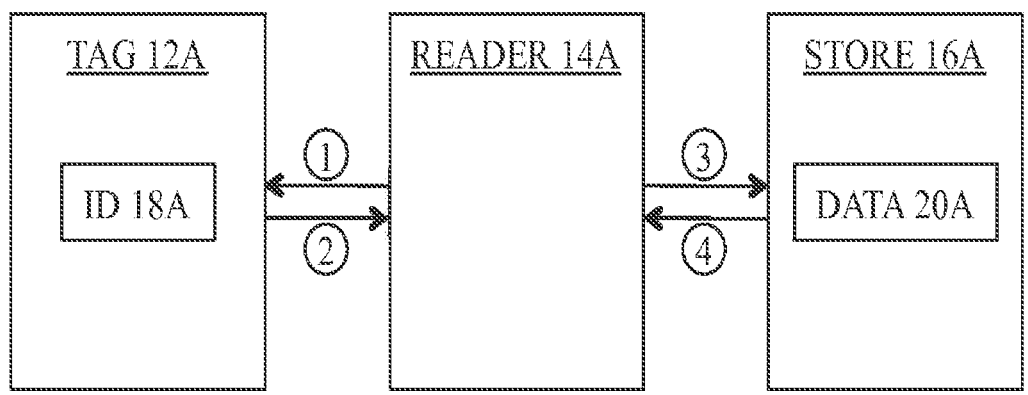
FIG. 2 illustrates in block diagram form, a prior art RFID system, including a tag, a reader, and a store.

As will be evident to those skilled in the art, our improved security techniques may be practiced in the prior art systems depicted in FIG. 1 and FIG. 2, as well as in our RFID systems 10B-F depicted in FIGS. 3, 5, 7 and 8, respectively. As is known, each of the illustrated embodiments will typically include additional conventional components such as a display and a keyboard for interacting with the system 10x, and, as appropriate, a router or the like to enable connectivity between the reader 14x and the store 16x. Additionally, those skilled in the art will recognize that the master processor 50x is not limited to its location in the store 16x, but may also be incorporated into the reader 14x, or in some other location that allows it to interact with store 16x and the remainder of the components within the system 10x. In an alternate embodiment, store 16x, including all of the various components described above, may be completely incorporated into the reader 14x.

Other embodiments of our invention include, at a minimum, various types of tags. For example, tags may include active RFID tags, which typically include a battery, and passive RFID tags, which may have no battery or may be assisted by a battery. Our invention also includes tags with various read range capabilities.

Other embodiments of our invention include, at a minimum, various types of readers that have the capability to manage data and to communicate with tags and databases. For example, reader-enabled devices may include mobile phones, internet enabled phones, computers, smart phones, and Personal Digital Assistants ("PDAs").

Other embodiments of our invention include, at a minimum, various types of linkers. For example, our linker may include an object-oriented database.

Figure 10:
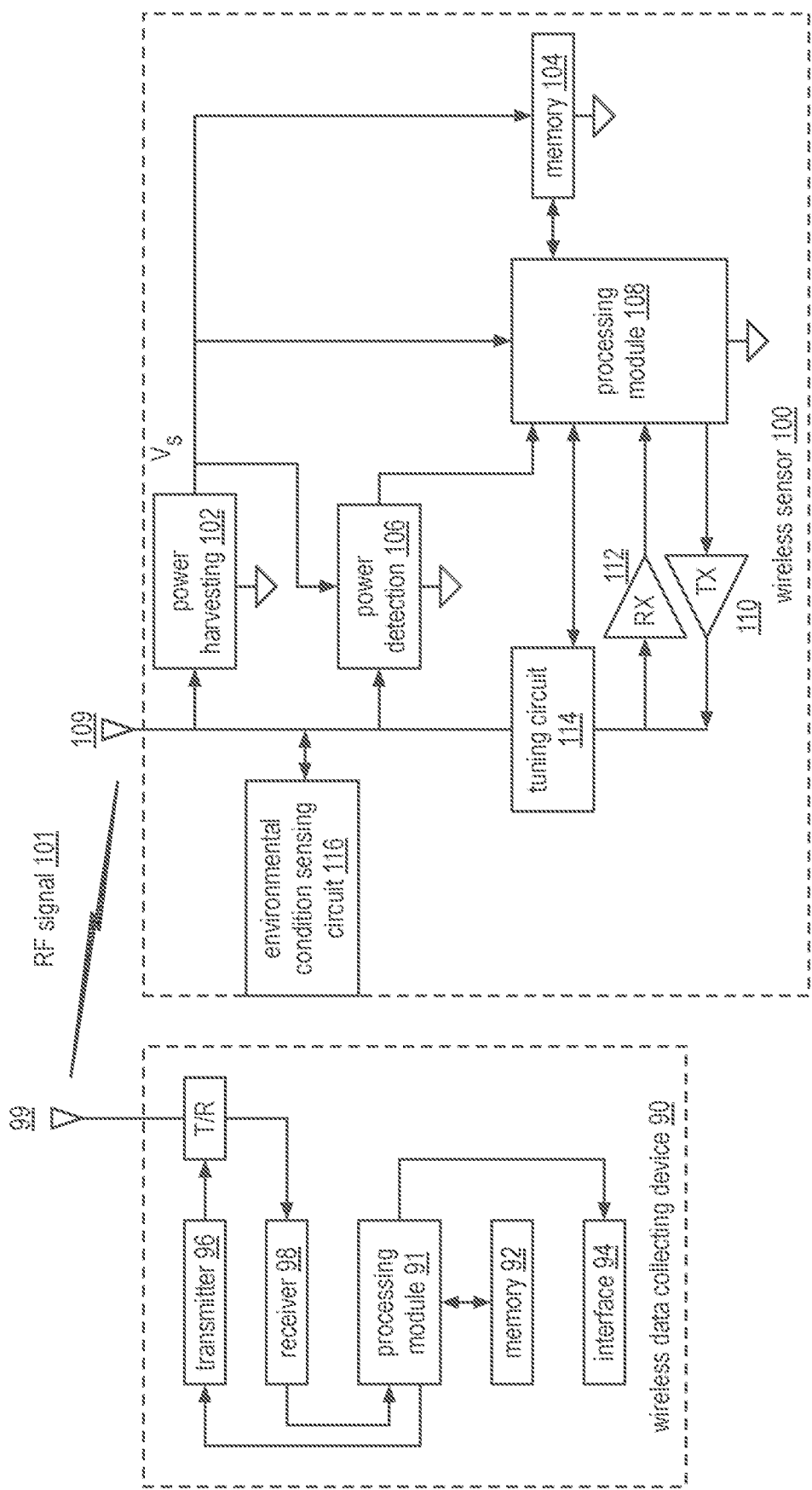
FIG. 10 is a schematic block diagram of an embodiment of a wireless data collecting device and a wireless sensor.

FIG. 10 is a schematic block diagram of an embodiment of a wireless data collecting device 90 (e.g., a radio frequency (RF) reader) and a wireless sensor (e.g., a radio frequency identification (RFID) tag). The wireless sensor 100 includes a power harvesting circuit 102, a processing module 108, memory 104, a receiver section 112, a transmitter section 110, an antenna structure 109, a power detection circuit 106, an environmental condition sensing circuit 116, and a tuning circuit 114. The wireless data collecting device 90 includes an antenna structure 99, a transmitter 96, a receiver 98, a transmit/receive splitter or switch (T/R), a processing module 91, memory 92, and an interface 94. The interface 94 may include firmware (e.g., software and hardware) to communicate with a computing device via a wired and/or wireless LAN and/or WAN.

In an example of operation, the wireless sensor 100 is a passive RFID tag and the wireless data collecting device 90 is an RFID reader. The passive RFID tag is associated with an object and an object identifier is stored in the memory 104 of the wireless sensor. For the RFID reader to communicate with the passive RFID tag, the tag first generates a power supply voltage (or multiple power supply voltages) from the RF (radio frequency) signal 101 transmitted from the RFID reader. For example, the RF signal 101 is a continuous wave signal and uses amplitude shift keying (ASK) or other modulation scheme to convey data.

The power harvesting circuit 102 receives the RF signal 101 via the antenna 109 and converts it into one or more supply voltages (Vs). The supply voltage(s) power the other components so that they may perform their specific tasks. For instance, the receiver 112 is operable to convert an inbound message received from the RFID reader into a baseband signal that it provides to the processing module 108. The processing module 108 processes the baseband signal and, when appropriate, generates a response that is subsequently transmitted via the antenna 109 by the transmitter 110. For example, the inbound message instructs the wireless sensor to provide a response with a pressure measurement and the stored ID of the object.

To obtain a pressure measurement, the environmental condition sensing circuit 116 senses the pressure within an area (e.g., within a tire of an automobile). For example, as the environmental condition sensing circuit 116 is subjected to different pressures (e.g., force per area measured in pounds per square inch or other units), its electrical characteristics change (e.g., a capacitance, an inductance, an impedance, a resonant frequency, etc.).

The change of electrical characteristics of the environmental condition sensing circuit 116 causes a change in an RF characteristic of the combination of the antenna 109, the tuning circuit 114, and the environmental condition sensing circuit 116. Note that an RF characteristic includes an impedance (e.g., an input impedance) at a frequency (e.g., carrier frequency of the RF signal 101), a resonant frequency (e.g., of the turning circuit and/or antenna), a quality factor (e.g., of the antenna), and/or a gain. As a specific example, the resonant frequency has changed from a desired resonant frequency (e.g., matching the carrier frequency of the RF signal 101) as result of an environmental condition.

The processing module 108 detects a variance of the one or more RF characteristics from a desired value (e.g., the resonant frequency changes from a desired frequency that corresponds to the carrier frequency of the RF signal 101). When the processing module detects the variance, it adjusts the tuning circuit to substantially re-establish the desired value of the one or more RF characteristics. For example, the tuning circuit 114 includes an inductor and a capacitor, one of which is adjusted to change the resonant frequency back to the desired value.

The processing module 108 determines the amount of adjusting of the tuning circuit 114 and converts the amount of adjusting into a digital value. For example, the digital value may be representative of the pressure sensed by the environmental condition sensing circuit 116. The processing module 108 generates a message regarding the adjusting of the tuning circuit (e.g., the message includes the digital value or an actual pressure measurement if the processing module performs a digital value to pressure measurement conversion function). The transmitter 110 transmits the message to the data collecting device via the antenna 109 or other antenna (not shown in FIG. 10).

Before the processing module processes the sensed environmental condition, it may perform a power level adjustment. For example, the power detection circuit 106 detects a power level of the received RF signal 101. In one embodiment, the processing module interprets the power level and communicates with the RFID reader to adjust the power level of the RF signal 101 to a desired level (e.g., optimal for accuracy in detecting the environmental condition). In another embodiment, the processing module includes the received power level data with the environmental sensed data it sends to the RFID reader so that the reader can factor the power level into the determination of the extent of the environmental condition. Using the power level to determine the environmental condition is discussed in further detail in reference to FIGS. 11-12.

The processing module 108 may further operable to perform a calibration function when the pressure in which the wireless sensor is known (e.g., in a room at a certain altitude, in a calibration chamber having a set pressure, etc.). For example, the processing module 108 receives a calibration request from a data collecting device. In response, the processing module adjusts the tuning circuit to establish the desired value of the RF characteristic(s) (e.g., resonant frequency, input impedance, etc.). The processing module then records a level of the adjusting of the tuning circuit to represent a pressure calibration of the wireless sensor (e.g., records a digital value). The processing module may communicate the calibration value to the data collecting device as part of the calibration process or send it along with the digital value of a pressure measurement.

FIG. 10 is a graphical representation of an example of receiving power level feedback of a radio frequency identification (RFID) tag. As illustrated, an RFID reader 111 (which may be implemented by the wireless data collecting device 90 of FIG. 10) transmits a plurality of radio frequency (RF) signals 101 to the RFID tag. Each RF signal 101 of the plurality of RF signals 101 may include a unique carrier frequency and an instruction to the RFID tag to respond with a received power level indication. For example, the RFID reader 111 may transmit a first RF signal 101 at a first carrier frequency, a second RF signal 101 at a second carrier frequency, and a third RF signal 101 at a third carrier frequency, etc. The RFID reader receives responses from the RFID tag that include a received power level. For example, the RFID tag transmits a digital value of a received power level to the RFID reader. The RFID reader may then use the received power levels to determine a resonant frequency of the RFID tag, which is used to determine an environmental condition to which the RFID tag is exposed.

Also illustrated is the power level feedback of a calibrated condition at various carrier frequencies and the power level feedback of an environmental condition at various carrier frequencies. For example, under known environment conditions (e.g., certain temperature, moisture level, etc.), the RFID reader 111 performs a calibration by sending a plurality of RF signals to an RFID tag. As shown, the RFID reader then receives responses from the RFID tag with received power levels that are used to determine the resonant frequency of the RFID tag. In one example, the RFID reader may select other carrier frequencies in the range of the carrier frequencies that responded with the highest power levels, and send additional RF signals to the RFID tag to further determine the resonant frequency of the RFID tag. In another example, the RFID reader may select other carrier frequencies in the range of the carrier frequency that responded with a received power level (e.g., when only one response from the RFID tag to the first RF signal(s) was received), and send additional RF signals to the RFID tag to further determine the resonant frequency of the RFID tag. In yet another example, the RFID reader determines (e.g., performs a function on the received power levels) the resonant frequency of the RFID tag based on the received power levels at the respective carrier frequencies.

When the RFID tag is exposed to an environmental condition (e.g., bottom portion of FIG. 11), the environmental condition may cause one or more RF characteristics (e.g., frequency, impedance, etc.) of the tag to change. In this example, the RF reader may determine an estimated resonant frequency based on receiving responses from the RFID tag that include received power level feedback at various frequencies. For example, the RFID reader 90 transmits a plurality of RF signals to the RFID tag that is exposed to an environmental condition. The RFID reader then receives response (e.g., as shown, a first response through a fifth response) from the RFID tag that includes received power level indications. Having received the received power level indications, the RFID reader determines an estimated resonant frequency of the RFID tag based on at least one of the received power level indications and the corresponding carrier frequencies. In the example shown, a Nth carrier frequency of the received responses corresponds to the largest power level. In one example, the RFID reader may use the Nth carrier frequency as the estimated resonant frequency. In another example, the RFID reader may use an average (or other function) of two or more carrier frequencies to estimate the resonant frequency of the RFID tag.

Having estimated the resonant frequency of the RFID tag exposed to the environmental condition, the RFID reader uses the estimated resonant frequency to determine an environmental condition. For example, the RFID reader compares (e.g., performs a look up) a resonant frequency of the known calibrated condition with the estimated resonant frequency to determine the environmental condition. As another example, the RFID reader compares a first estimated resonant frequency at a first time with a second resonant frequency at a second time (e.g., to determine pressure is increasing). Note the RFID reader may use more than two received power level indications (e.g., to attain greater accuracy of the estimated resonant frequency).

Figure 11:
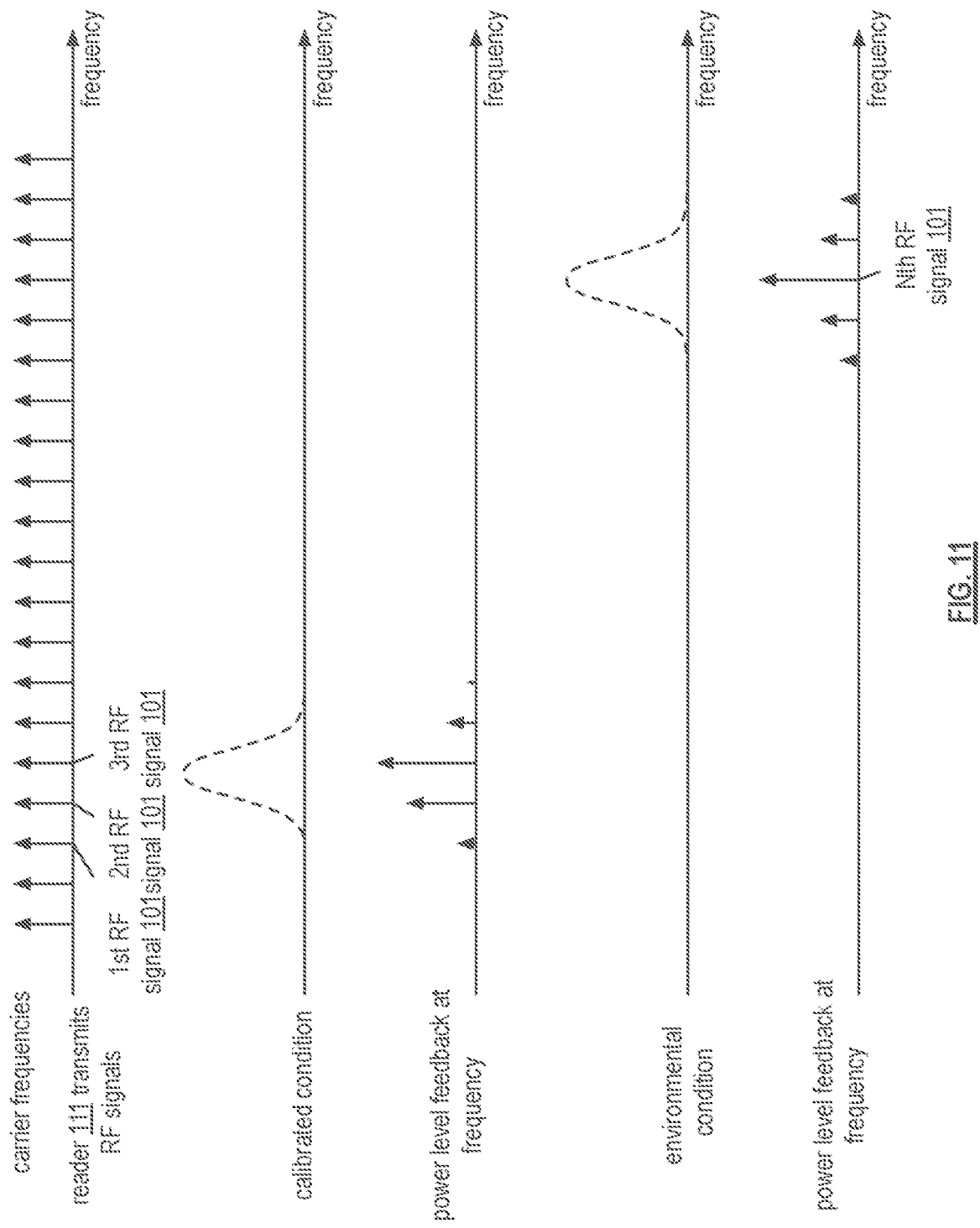
FIG. 11. is an illustration of receiving power level feedback from an RFID tag.
Figure 12:
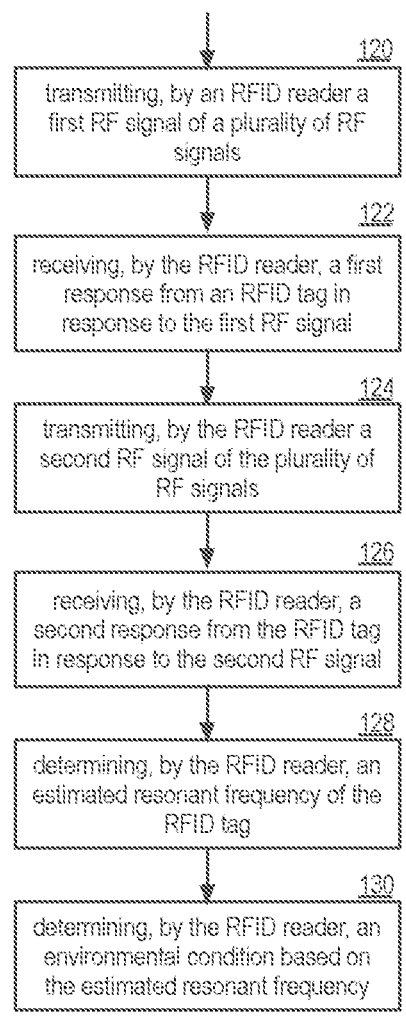
FIG. 12 is a flowchart illustrating an example of a method of determining an environmental condition.

FIG. 11 is a logic flow diagram of a method of determining an environmental condition based on received power level indications. The method begins at step 120, where a radio frequency identification (RFID) reader transmits a first radio frequency (RF) signal of a plurality of RF signals. Each RF signal of the plurality of RF signals includes a unique carrier frequency and further includes an instruction to an RFID tag to respond with a received power level indication. The instruction may also include a request for the RFID tag to respond with a unique identifier that identifies the RFID tag. The transmitting may include transmitting the plurality of RF signals in one of a plurality of patterns. For example, a pattern of the plurality of patterns may be a low carrier frequency to a high carrier frequency pattern. As another example, the pattern of the plurality of patterns may be a high carrier frequency to a low carrier frequency pattern. As yet another example, the pattern of the plurality of patterns may be a random carrier frequency pattern.

The method continues with step 122, where the RFID reader receives a first response from the RFID tag in response to a first RF signal of the plurality of RF signals. The first response includes a first received power level indication and the first RF signal has a first carrier frequency. The method continues with step 124, where the RFID reader transmits a second RF signal of the plurality of RF signals. The method continues with step 126, where the RFID reader receives a second response from the RFID tag in response to the second RF signal of the plurality of RF signals. The second response includes a second received power level indication, and the second RF signal has a second carrier frequency. The method continues with step 128, where the RFID reader determines an estimated resonant frequency of the RFID tag based on the first and second received power level indications and the first and second carrier frequencies. The method continues with step 130, where the RFID reader determines an environmental condition (e.g., temperature, pressure, moisture, etc.) based on the estimated resonant frequency. Note the RFID reader may use more than two received power levels to estimate the resonant frequency of the RFID tag. For example, prior to the determining the estimated resonant frequency the RFID reader may receive a third response from the RFID tag in response to a third RF signal of the plurality of RF signals. The third response includes a third received power level indication and the third RF signal has a third carrier frequency. Then the RFID reader determines the estimated resonant frequency of the RFID tag based on the first, second and third received power level indications and the first, second and third carrier frequencies.

Alternatively, or in addition to the above method, the RFID reader may transmit the RF signals based on a known environmental condition to determine an estimated calibrated resonant frequency of the RFID tag. For example, the RFID reader transmits a plurality of RF signals, where each RF signal of the plurality of RF signals includes the unique carrier frequency and further includes the instruction to the RFID tag to respond with the received power level indication. Next, the RFID reader receives the first response from the RFID tag in response to the first RF signal of the plurality of RF signals, where the first response includes the first received power level indication, where the first RF signal has the first carrier frequency, and where the first RF signal of the plurality of signals is based on a known environmental condition. The method continues by receiving the second response from the RFID tag in response to the second RF signal of the plurality of RF signals, where the second response includes the second received power level indication, where the second RF signal has a second carrier frequency and where the second RF signal of the plurality of signals is based on the known environmental condition. Having received the first and second responses, the RFID reader determines an estimated calibrated resonant frequency of the RFID tag based on the first and second received power level indications and the first and second carrier frequencies.

The RFID reader then receives a third response from the RFID tag in response to a third RF signal of the plurality of RF signals, where the third response includes a third received power level indication, where the third RF signal has a third carrier frequency, and where the third RF signal of the plurality of signals is based on an unknown environmental condition. The RFID reader then receives a fourth response from the RFID tag in response to a fourth RF signal of the plurality of RF signals, wherein the fourth response includes a fourth received power level indication, where the fourth RF signal has a fourth carrier frequency, and where the fourth RF signal of the plurality of signals is based on the unknown environmental condition.

Having received the third and fourth responses, the RFID reader determines the estimated resonant frequency of the RFID tag based on the third and fourth received power level indications and the third and fourth carrier frequencies. The RFID reader may then determine the environmental condition based on a difference between the estimated resonant frequency and the estimated calibrated resonant frequency.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc., any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A radio frequency identification (RFID) reader comprises:
    a transmitter operably coupled to: transmit a first radio frequency (RF) signal, wherein the first RF signal includes a first carrier frequency and further includes an instruction to an RFID tag to respond with a received power level indication; and transmit a second RF signal to the RFID tag, wherein the second RF signal includes a second carrier frequency and further includes the instruction to an RFID tag to respond with a received power level indication;
    a receiver operably coupled to: receive a first response from the RFID tag in response to the first RF signal, wherein the first response includes a first received power level indication; and receive a second response from the RFID tag in response to the second RF signal, wherein the second response includes a second received power level indication; and
    a processing module operably coupled to determine an estimated resonant frequency of the RFID tag based on the first and second received power level indications and the first and second carrier frequencies.

2. The RFID reader of claim 1, wherein the instruction comprises:
    a request for the RFID tag to respond with a unique identifier that identifies the RFID tag.

3. The RFID reader of claim 1 further comprises:
    the first carrier frequency being a first frequency within a range of frequencies that correspond to a known calibration condition; and
    the second carrier frequency being a second frequency within the range of frequencies that correspond to the known calibration condition.

4. The RFID reader of claim 1 further comprises:
    a transmitter operably coupled to:
        transmit a third RF signal to the RFID tag, wherein the third RF signal includes a third carrier frequency and further includes the instruction to an RFID tag to respond with a received power level indication;
    a receiver operably coupled to:
        receive a third response from the RFID tag in response to the third RF signal, wherein the third response includes a third received power level indication.

5. The RFID reader of claim 4, wherein the processing module is further operable to:
    determine the estimated resonant frequency of the RFID tag based on one of:
        the first and second received power level indications and the first and second carrier frequencies;
        the first and third received power level indications and the first and third carrier frequencies;
        the second and third received power level indications and the second and third carrier frequencies; and
        the first, second, and third received power level indications and the first, second, and third carrier frequencies.

6. The RFID reader of claim 1, wherein the processing module is further operable to:
    determine a power level adjustment for the RFID tag based on the estimated resonant frequency of the RFID tag.

7. A radio frequency identification (RFID) reader comprises:
    a transmitter operably coupled to:
        transmit a plurality of radio frequency (RF) signals to a plurality of RFID tags, wherein an RF signal of the plurality of RF signals includes an instruction to respond with a received power level indication;
    a receiver operably coupled to:
        receive a first response from a first RFID tag of the plurality of RFID tags, wherein the first response includes a first received power level indication regarding one of the plurality of RF signals;
        receive a second response from the first RFID tag, wherein the second response includes a second received power level indication regarding a second one of the plurality of RF signals;
        receive a third response from a second RFID tag of the plurality of RFID tags, wherein the third response includes a third received power level indication regarding the one of the plurality of RF signals or another one of the plurality of RF signals; and receive a fourth response from the second RFID tag, wherein the fourth response includes a fourth received power level indication regarding the second one of the plurality of RF signals or a second other one of the plurality of RF signals; and a processing module operably coupled to:

determine a first estimated resonant frequency of the first RFID tag based on the first and second received power level indications and frequencies of the one of the plurality of RF signals and the second one of the plurality of RF signals;

determine a second estimated resonant frequency of the second RFID tag based on the third and fourth received power level indications and frequencies of the one of the plurality of RF signals or the other one of the plurality of RF signals and the second one of the plurality of RF signals or the second other one of the plurality of RF signals.

8. The RFID reader of claim 7, wherein the instruction comprises:

a request for the RFID tag to respond with a unique identifier that identifies the RFID tag.

9. The RFID reader of claim 7 further comprises:

the one of the plurality of RF signals having a first frequency within a range of frequencies that correspond to a known calibration condition; and the second one of the plurality of RF signals having a second frequency within the range of frequencies that correspond to the known calibration condition.

10. The RFID reader of claim 7 further comprises:

a receiver operably coupled to:

receive a fifth response from the first RFID tag, wherein the third response includes a third received power level indication regarding a third one of the plurality of RF signals.

11. The RFID reader of claim 10, wherein the processing module is further operable to:

determine the first estimated resonant frequency of the first RFID tag based on one of:

the first and second received power level indications and the one of the plurality of RF signals and the second one of the plurality of RF signals;

the first and fifth received power level indications and the one of the plurality of RF signals and the third one of the plurality of RF signals;

the second and third received power level indications and the second one of the plurality of RF signals and the third one of the plurality of RF signals; and the first, second, and third received power level indications and the one of the plurality of RF signals, the second one of the plurality of RF signals, and the third one of the plurality of RF signals.

12. The RFID reader of claim 1, wherein the processing module is further operable to:

determine a first power level adjustment for the first RFID tag based on the first estimated resonant frequency; and determine a second power level adjustment for the second RFID tag based on the second estimated resonant frequency.

* * * * *